May 17, 1927.
A. F. REITZ
DILATOR
Filed Oct. 2, 1925
1,629,119
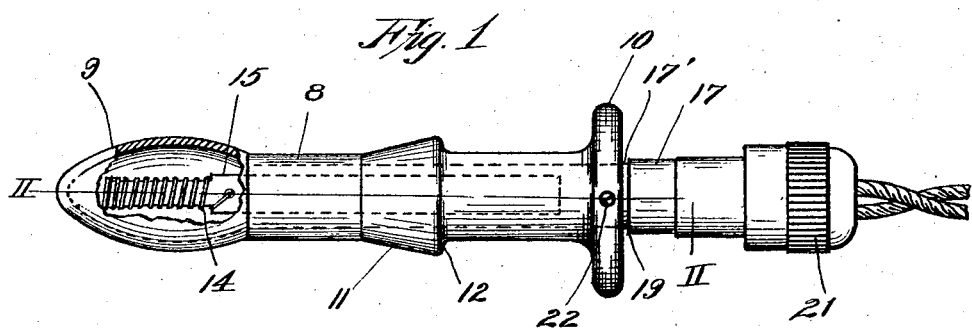
Fig. 1
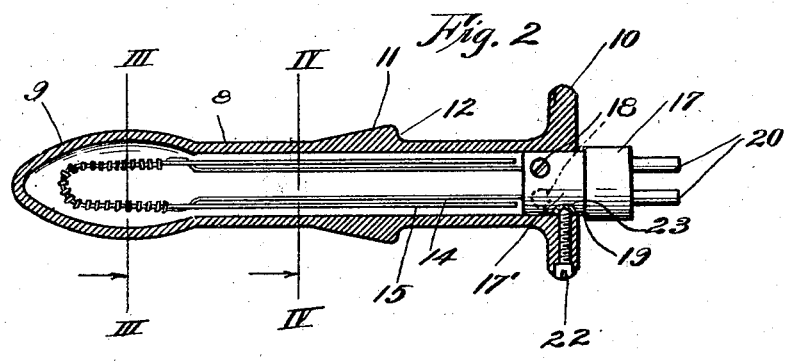
Fig. 2
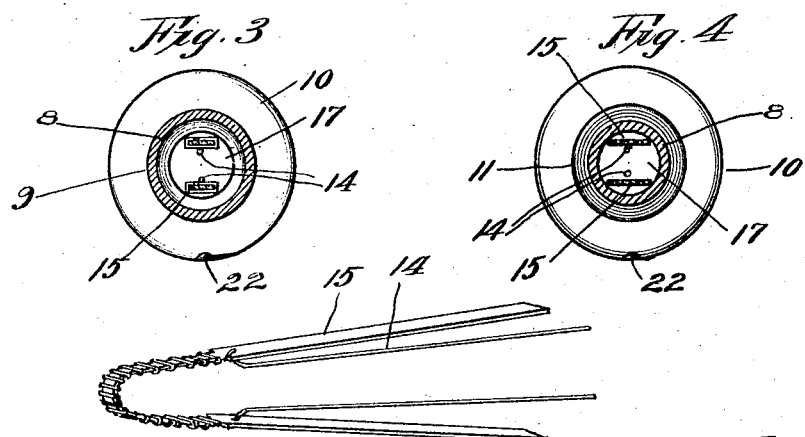
Fig. 3
Fig. 4
Fig. 5
Witness:
R. E. Hamilton
Inventor:
Albert F. Reitz
By Thorpe & Gerard,
his Attorneys Patented May 17, 1927.

1,629,119

UNITED STATES PATENT OFFICE.

ALBERT F. REITZ, OF KANSAS CITY, MISSOURI.

DILATOR.

Application filed October 2, 1925. Serial No. 60,034.

This invention relates to dilators, and particularly to devices of this character which are provided with heating elements in order to enable the dilators to exert a therapeutic effect by the action of heat.

Accordingly, this invention aims to provide a novel dilator construction having an electrical heating element fitted with an improved electric insulating element adapted to maintain the heating unit in proper operative position within the body of the dilator. In embodying the device in practical form, the same comprises a heating element equipped with an insulating element of resilient material for lending support to the heating coil and also maintaining the branches of the heating elements in proper separated relation.

The heating unit assembly also comprises a construction including a plug fitting the open end of the dilator casing, and cooperating with the resilient insulating element, as the latter frictionally engages the interior of the dilator body, for imposing a slight tension upon the branches of the heating element and thus eliminating any kinks or bends that might result from the insertion of the heating unit into the dilator body.

It is also sought to provide a dilator having an exterior tapered portion intermediate its ends, for facilitating the application of the device into operative position, said tapered portion being also formed with a shoulder tending to oppose any casual displacement of the device while in operative position.

With these general objects in view, the invention will now be described by reference to the accompanying drawing illustrating one form of construction which I have devised for embodying the proposed improvements, after which those features deemed to be novel will be particularly set forth and claimed.

In the drawing—

Figure 1 is a plan view, partly broken away, showing a dilator construction embodying the proposed features of improvement;

Figure 2 is a longitudinal section taken on the line II—II of Figure 1;

Figures 3 and 4 are transverse sections taken on the lines III—III and IV—IV, respectively, of Figure 2; and Figure 5 is a perspective view illustrating the heating unit or assembly removed from the dilator casing.

Referring now to the drawing in detail, this shows a hollow dilator casing 8 having a slightly enlarged oval portion 9 at its closed end, and a suitable flange 10 at its open end for limiting the application of the casing into operative position. Intermediate its ends, the exterior of the casing is formed with an enlargement 11, suitably tapered in the direction of the closed end of the casing, whereas that portion of the enlargement 11 which is nearest to the open end of the casing 8 is formed with a shoulder 12 adapted to oppose any casual withdrawing movement of the dilator when in position of use.

The heating unit or assembly which is designed to be placed inside the dilator casing 8 comprises an electrical heating element 14 which may, under some conditions, be coated with shellac, the intermediate portion of which element 14 is coiled about the middle portion of an insulating element 15 of mica or fiber material, having a certain degree of resiliency, so that when formed into U-shape as illustrated in Figures 2 and 5, the legs of the element 15 will act to spread apart the branches of the heating wire 14 to maintain the same in proper separated relation; in addition to which, the free ends of the leg portions of the insulating element 15 will spring into frictional engagement with the interior of the casing 8, and thereby oppose any withdrawing action of the heating assembly, as will be readily understood. The ends of the heating wire 14 are received in the usual form of plug 17 and secured thereto by clamp screws 18, the plug 17 having a reduced portion 17' for fitting in the mouth or open end of the casing 8, as clearly shown in Figure 2. The plug 17 has the usual posts 20 for making electrical connection with the socket member 21 (Figure 1), whereby the device may be supplied with electric energy from any suitable source. In assembling the heating unit within the casing 8 of the device, it will be understood that the heating wire 14 is connected to the plug 17 and secured thereto by the screws 18, and then the assembly 14—15 is thrust into the interior of the casing 8 to the full depth of the reduced portion 17' of the plug 17 within the mouth or open end of the casing, that is, till its shoulder portion 19 is stopped against the outer face of the flange 10. In this inserting movement, the legs 15 of the insulating element resiliently engage the interior of the casing 8 (see Figure 4), and hence serve to counteract any withdrawal movement of the heating unit; now the plug 17 is withdrawn slightly from the open end of the casing, to the position shown in Figure 2, so that, as the insulating element 15 remains substantially stationary, a slight tension is imposed upon the heating wire 14, thus straightening out any crooks or kinks in the wire, and the supporting action of the element 15 and the plug 17 serves to maintain the wire 14 in substantially central position within the interior of the casing 8, with the branches of the wire separated properly out of contact with each other, as clearly illustrated in Figure 2. The plug 17 is now secured in this slightly withdrawn position from the casing 8 by means of a clamp screw 22 fitted through the flange 10 and engaging a slight depression 23 in the plug 17.

It will thus be apparent that I have devised a practical and efficient device for carrying out the objects of the invention, and that the same is adapted for use in any of the applications in which a device of this character may be desired for exerting a therapeutic action by a heating effect, combined with a dilation of the muscles and fleshy parts that are involved. While I have illustrated and described what I now regard as the preferred form of construction for embodying the improvements, I desire to reserve the right to make all such changes or modifications as may fairly fall within the scope of the appended claims.

What I claim is:

1. A dilator comprising a hollow casing open at one end, an electric heating element within said casing, a U-shaped insulating element carrying said heating element and having its free ends located adjacent the open end of said casing, said insulating element being slightly resilient for maintaining the branches of said heating element in separated relation.

2. A dilator comprising a hollow casing open at one end, a plug for the open end of said casing, a heating element connected to said plug, and a resilient U-shaped insulating element supporting said heating element out of contact with the interior of the casing, said insulating element having its free ends located adjacent to said plug and adapted for frictional engagement with the interior of the casing.

3. A dilator comprising a hollow casing open at one end, a plug for the open end of said casing, a heating element connected to said plug, and a resilient U-shaped insulating element of slightly less length of said heating element and adapted to support the latter out of contact with the interior of the casing, said insulating element having its free ends in frictional engagement with the interior of the casing adjacent to said plug, whereby a slight withdrawal of the latter will effect a tensioning of the branches of said heating element.

4. A dilator comprising a hollow casing open at one end, a plug for the open end of said casing, a heating element connected to said plug, and a resilient U-shaped insulating element of slightly less length of said heating element and adapted to support the latter out of contact with the interior of the casing, said insulating element having its free ends in frictional engagement with the interior of the casing adjacent to said plug, and means for securing said plug in slightly spaced relation to the ends of said insulating element for maintaining the branches of said heating element under slight tension.

In witness whereof I hereunto affix my signature.

ALBERT F. REITZ.